US009955429B2

(12) United States Patent  
Peräkamppi et al.

(10) Patent No.: US 9,955,429 B2  
(45) Date of Patent: Apr. 24, 2018

(54) BATTERY CURRENT CONSUMPTION ADJUSTMENT FOR AN ILLUMINATION UNIT

(71) Applicant: MICROSOFT TECHNOLOGY LICENSING, LLC, Redmond, WA (US)

(72) Inventors: Antti Peräkamppi, Tampere (FI); Lassi Ylä-Soininmäki, Hämeenlinna (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/080,497

(22) Filed: Mar. 24, 2016

(65) Prior Publication Data

US 2017/0150451 A1     May 25, 2017

Related U.S. Application Data

(60) Provisional application No. 62/259,438, filed on Nov. 24, 2015.

(51) Int. Cl.
*H04W 52/02*     (2009.01)
*H04B 1/3827*     (2015.01)
(Continued)

(52) U.S. Cl.
CPC ........ *H04W 52/0277* (2013.01); *G03B 15/05* (2013.01); *H04B 1/3833* (2013.01);
(Continued)

(58) Field of Classification Search
CPC ......... H04N 5/225; H05B 37/02; Y02B 20/48
(Continued)

(56) References Cited

U.S. PATENT DOCUMENTS 6,593,032 B1   7/2003   Yoshihara et al.
7,782,018 B2   8/2010   Voigt
(Continued)

FOREIGN PATENT DOCUMENTS

CA     2616506 C    9/2010
EP     2116896 A1   11/2009

OTHER PUBLICATIONS

"Dual-Phase Adaptive DC-DC Step-Up Converter with 2x 1000mA High-Side Current Regulators", Retrieved on: Nov. 27, 2015, 80 pages, Available at: https://datasheets.maximintegrated.com/en/ds/MAX77387.pdf.

(Continued)

*Primary Examiner* — Kiet M Doan (57) ABSTRACT

In one example, an apparatus comprises a battery that has a first characteristic capability for providing continuous power and a second characteristic capability for providing intermittent power to the apparatus. The apparatus further comprises an illumination unit. The apparatus further comprises a controller that is configured to determine the total current consumption of the apparatus, determine the amount of battery current available to the illumination unit, and adjust current consumption of the illumination unit based on the determined available amount of battery current to ensure that the current consumption of the illumination unit stays below a battery safety circuit current limit.

20 Claims, 5 Drawing Sheets

(51) Int. Cl.
- H05B 33/08 (2006.01)
- H05B 37/02 (2006.01)
- H04M 1/00 (2006.01)
- G03B 15/05 (2006.01)
- H04N 5/225 (2006.01)
- H04N 5/232 (2006.01)
- H04N 5/235 (2006.01)

(52) U.S. Cl.
CPC ............ *H04M 1/00* (2013.01); *H04N 5/2256* (2013.01); *H04N 5/2354* (2013.01); *H04N 5/23241* (2013.01); *H05B 33/0845* (2013.01); *H05B 37/0227* (2013.01)

(58) Field of Classification Search
USPC ......... 455/574, 418, 556.1; 307/25, 66, 141, 307/140, 126; 315/152, 201; 340/8.1, 340/539.13
See application file for complete search history.

(56) References Cited

U.S. PATENT DOCUMENTS

| | | | |
|---|---|---|---|
| 7,990,074 B2 | 8/2011 | Sandner et al. | |
| 8,040,069 B2 | 10/2011 | Drader et al. | |
| 8,421,357 B2* | 4/2013 | Geris | G03B 15/05 315/200 A |
| 8,704,450 B2 | 4/2014 | Chen et al. | |
| 9,146,447 B2 | 9/2015 | Khuntia | |
| 2004/0127206 A1* | 7/2004 | Van Bosch | H04W 52/0216 455/418 |
| 2006/0062092 A1 | 3/2006 | Ueyama | |
| 2008/0037979 A1 | 2/2008 | Guthrie et al. | |
| 2008/0179957 A1* | 7/2008 | Tsui | H02J 7/0013 307/66 |
| 2009/0258676 A1* | 10/2009 | Tanaka | H04M 1/6058 455/556.1 |
| 2015/0092103 A1 | 4/2015 | Lundgren et al. | |
| 2015/0227027 A1 | 8/2015 | Otsuka | |
| 2015/0241493 A1* | 8/2015 | Canne | G01R 29/0814 324/612 |

OTHER PUBLICATIONS

"Flexible Flash Current Programming with AS2Cwire- and I2C-Enabled Flash LED Drivers", Published on: Sep. 24, 2012, 11 pages, Available at: http://www.skyworksinc.com/uploads/documents/202386A.pdf.

Mars, Pierre, "Power Required for LED Solution", In White Paper of Tecate Group, Published on: May 15, 2012, 6 pages, Available at: https://www.tecategroup.com/white_papers/badnames/Powering_High_Brightness_LEDs_in_Camera_Phones.pdf.

"International Search Report and Written Opinion Issued in PCT Application No. PCT/US2016/062382", dated Feb. 8, 2017, 16 Pages.

"Second Written Opinion Issued in PCT Application No. PCT/US2016/062382", dated Nov. 2, 2017, 9 Pages.

* cited by examiner

BATTERY CURRENT CONSUMPTION ADJUSTMENT FOR AN ILLUMINATION UNIT

BACKGROUND

Batteries in various electronic devices, including mobile communication devices have a limit on how much current the device can use e.g. within a time period. If the limit is exceeded, a safety circuit may shut down the device. A camera light-emitting diode (LED) flash is a component that can consume high amounts of current. As a result, there may be instances when the current consumed by the camera LED flash needs to be limited so that it does not exceed the battery limit.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one example, an apparatus comprises a battery that has a first characteristic capability for providing continuous power and a second characteristic capability for providing intermittent power to the apparatus. The apparatus further comprises an illumination unit. The apparatus further comprises a controller that is configured to determine the total current consumption of the apparatus, determine the amount of battery current available to the illumination unit, and adjust current consumption of the illumination unit based on the determined available amount of battery current to ensure that the current consumption of the illumination unit stays below a battery safety circuit current limit.

In another example, a system and a method have been discussed along with the features of the apparatus.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

At least some of the disclosed examples may allow battery current consumption adjustment for an illumination unit to ensure that the current consumption of the illumination unit stays below a battery safety circuit current limit. Particularly when battery specific maximum possible current consumption of an apparatus/system is known and actual present current consumption is known, then illumination unit current consumption can be adjusted so that it is using maximum available current while staying below the battery safety circuit current limit.

Figure 1:
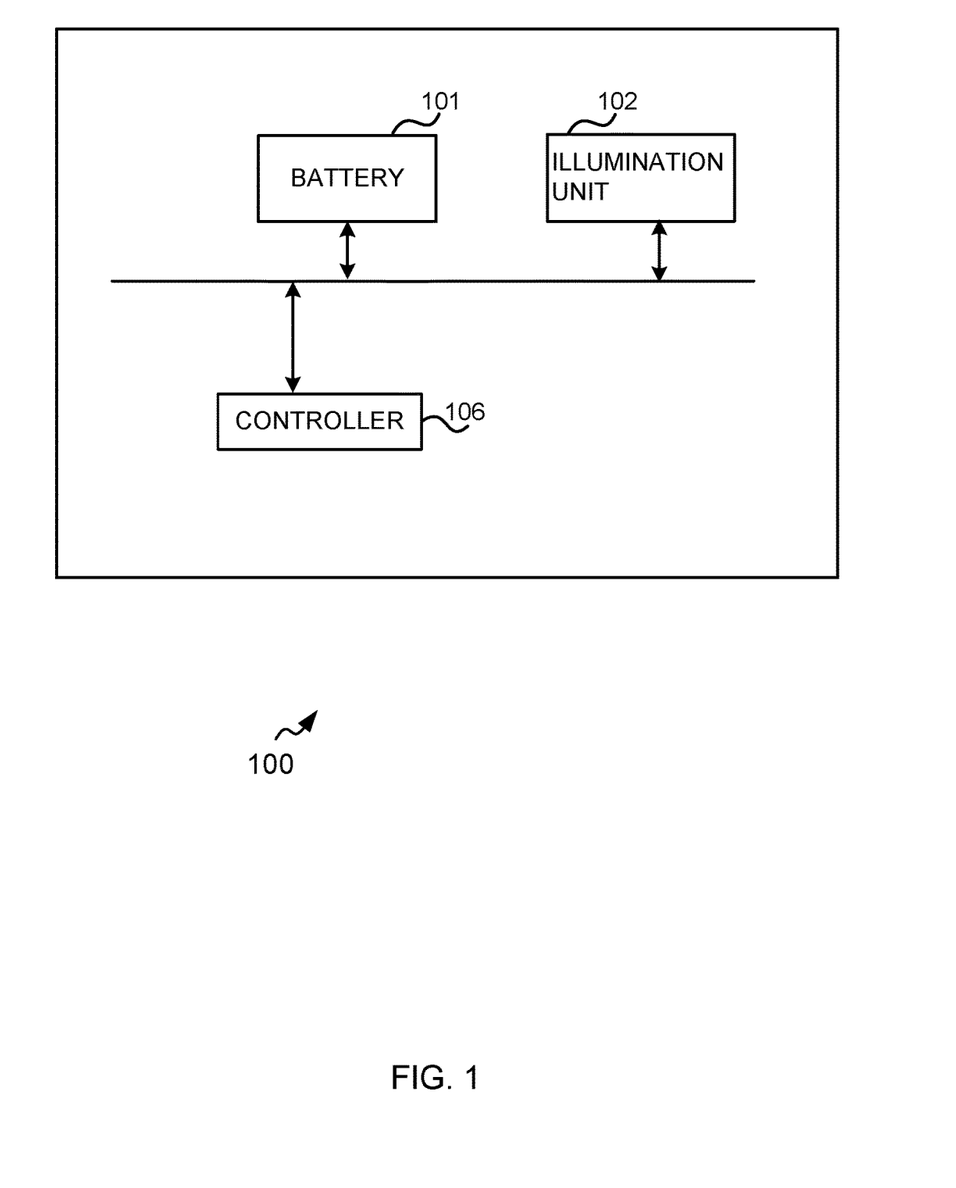
FIG. 1 is an example block diagram of an apparatus in accordance with an example embodiment.

FIG. 1 illustrates an apparatus 100 in accordance with an example embodiment. The apparatus 100 may be employed, for example, in the electronic device 500 of FIG. 5. However, it should be noted that the apparatus 100 may also be employed on a variety of other devices and apparatuses, and therefore, embodiments should not be limited to application on devices and apparatuses such as the electronic device 500 of FIG. 5. Furthermore, it should be noted that at least some of the elements described below may not be mandatory and thus some may be omitted in certain embodiments.

The apparatus 100 comprises a battery 101 that has a first characteristic capability for providing continuous power and a second characteristic capability for providing intermittent power to the apparatus 100. The apparatus 100 further comprises an illumination unit 102. The apparatus 100 further comprises a controller 106 that is configured to determine total current consumption of the apparatus 100, determine the amount of battery current available to the illumination unit 102, and adjust current consumption of the illumination unit 102 based on the determined available amount of battery current to ensure that the current consumption of the illumination unit 102 stays below a battery safety circuit current limit.

The controller 106 may comprise software and/or hardware. The controller 106 may comprise a driver of the illumination unit 102. For example, the controller 106 may be included at least partially in an operating system of the apparatus 100, such as operating system 504 of FIG. 5. In an embodiment, the controller 106 may be included at least partially in application software of the apparatus 100, such as applications 506 of FIG. 5. In an embodiment, the controller 106 may comprise a hardware based driver of the illumination unit 102. The adjusting of the current consumption of the illumination unit 102 may comprise maximizing the current consumption of the illumination unit 102 within the determined available amount of battery current. The illumination unit 102 may comprise e.g. one or more light-emitting diodes or a display unit of the apparatus 100. The display unit may comprise e.g. a liquid-crystal display (LCD) unit or an organic light-emitting diode (OLED) display unit. The apparatus 100 may comprise a wireless communication apparatus, such as a smart phone or a tablet computer. In an embodiment, the apparatus 100 may comprise a battery pack, e.g. a USB (Universal Serial Bus) battery pack having a capability to charge USB devices and having a torch light as the illumination unit 102. Here, the controller 106 may be configured to adjust current consumption of the torch light depending on e.g. whether the USB charger is being used or not, or depending on the charging current.

The available amount of battery current for the illumination unit 102 may depend on how much current other elements and/or components and/or software of the apparatus 100 are consuming at any given moment so that the more current the other elements and/or components and/or software/applications (e.g. an on-going call, a camera mode that is on) consume, the less is available to the illumination unit 102.

The controller 106 may be further configured to utilize at least one of battery voltage, internal battery resistance, or temperature (e.g. system temperature or environment temperature) to assist in the determination of the total current consumption of the apparatus and/or in the determination of the amount of battery current available to the illumination unit 102. The controller 106 may be further configured to utilize the state of applications or other features of the apparatus 100 to assist in the determination of the total current consumption of the apparatus and/or in the determination of the amount of battery current available to the illumination unit 102. For example, in the case of the apparatus 100 comprising a telephone and there being an active call, additional current consumption caused by the active call may be estimated based on information about how much current an active call may use.

The controller 106 may be further configured to perform the determination of the total current consumption of the apparatus by acquiring data related to the total current consumption of the apparatus 100 transpired over a time period, and to utilize the acquired data to perform the determination of the amount of battery current available to the illumination unit 102. Furthermore, a statistical value comprising e.g. a peak value of the data and/or an average value of the data may be determined and utilized in the determination of the amount of battery current available to the illumination unit 102. Alternatively or in addition, the determination of the current consumption of the apparatus 100 at a given time or time period may be performed substantially in real-time.

The controller 106 may be further configured to perform the determination of the total current consumption of the apparatus, the determination of the amount of battery current available to the illumination unit, and/or the adjusting of the current consumption of the illumination unit 102 repeatedly for a time period.

It is to be understood, that the illumination unit 102 may comprise e.g. a single LED or multiple LEDs. The current consumed by one or more LEDs of the illumination unit 102 may be different from or the same as the current input to the illumination unit 102 from the battery 101. In the case of the illumination unit 102 comprising e.g. a super capacitor, a first portion of current may be fed from the super capacitor to the illumination unit 102 and a second portion of current may be fed from the battery 101. The input current may be split between multiple LEDs so that it is the same or different for at least some of the multiple LEDs.

Figure 2:
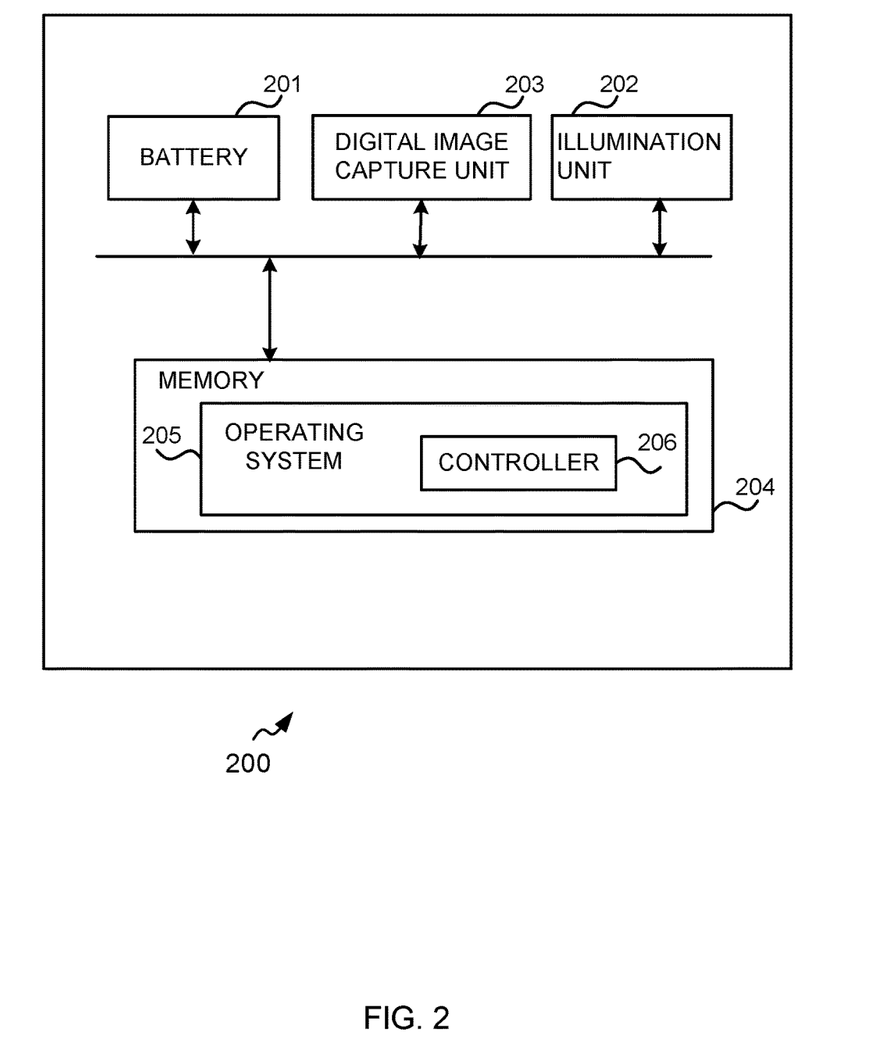
FIG. 2 is an example block diagram of an apparatus in accordance with an example embodiment.

FIG. 2 illustrates an apparatus 200 in accordance with an example embodiment. The apparatus 200 may be employed, for example, in the electronic device 500 of FIG. 5. However, it should be noted that the apparatus 200 may also be employed on a variety of other devices and apparatuses, and therefore, embodiments should not be limited to application on devices and apparatuses such as the electronic device 500 of FIG. 5. Furthermore, it should be noted that at least some of the elements described below may not be mandatory and thus some may be omitted in certain embodiments.

In the example of FIG. 2, the functionalities and properties of the battery 201, the illumination unit 202, and the controller 206 are substantially similar to those of their counterparts in the example of FIG. 1, so their descriptions are not repeated here in detail.

The example of FIG. 2 further comprises a digital image capture unit 203 (such as a digital camera module) that may be configured to capture digital image frames. The illumination unit 202 may be associated with the digital image capture unit 203, e.g. to assist in lighting a scene to be captured with the digital image capture unit 203. For example, for a first image frame (captured with a first flash of the illumination unit 202) the available amount of illumination unit 202 current may be higher than for subsequent image frames. In other words, if more image frames are captured soon after the first one, the available amount of current may get smaller, i.e. it may not be constant.

The example of FIG. 2 further comprises a memory 204. Stored in the memory 204 is an operating system 205 of the apparatus 200. In the example of FIG. 2, the controller 206 is comprised in the operating system 205.

Figure 3:
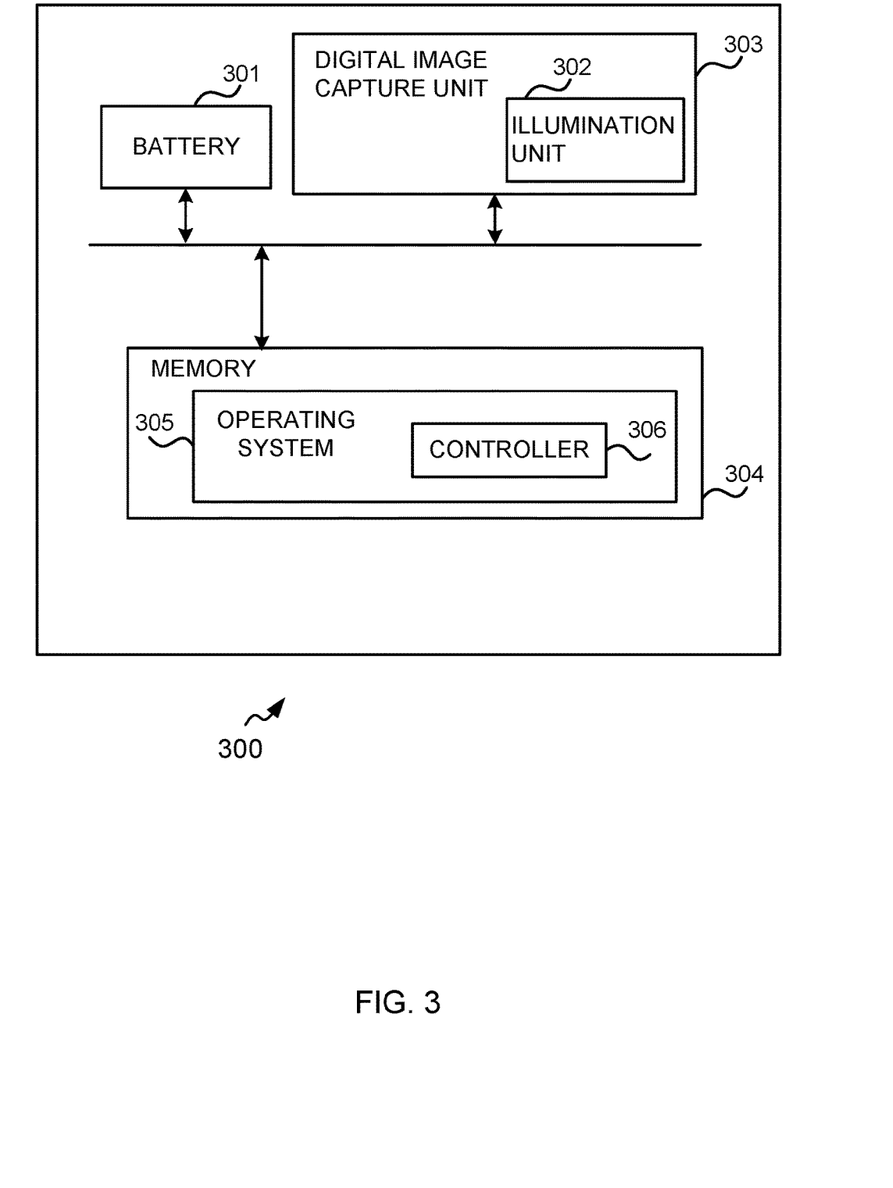
FIG. 3 is an example block diagram of a system in accordance with an example embodiment.

FIG. 3 illustrates a system 300 in accordance with an example embodiment. The system 300 may be employed, for example, in the electronic device 500 of FIG. 5. However, it should be noted that the system 300 may also be employed on a variety of other devices and apparatuses, and therefore, embodiments should not be limited to application on devices and apparatuses such as the electronic device 500 of FIG. 5. Furthermore, it should be noted that at least some of the elements described below may not be mandatory and thus some may be omitted in certain embodiments.

In the example of FIG. 3, at least some of the functionalities and properties of the battery 301, the illumination unit 302, the digital image capture unit 303, the memory 304, the operating system 305, and the controller 306 are substantially similar to those of their counterparts in the examples of FIG. 1 and FIG. 2, so their descriptions are not repeated here in detail. In the example of FIG. 3, the illumination unit 302 may be re-attachable.

The system 300 comprises a battery 301 that has a first characteristic capability for providing continuous power and a second characteristic capability for providing intermittent power to the system 300. The system 300 further comprises a digital image capture unit 303. The digital image capture unit 303 comprises an illumination unit 302. The system 300 further comprises a controller 306 that is configured to determine total current consumption of the system 300, determine the amount of battery current available to the digital image capture unit 303 including the illumination unit 302, and adjust current consumption of the digital image capture unit 303 including the illumination unit 302 based on the determined available amount of battery current to ensure that the current consumption of the digital image capture unit 303 including the illumination unit 302 stays below a battery safety circuit current limit.

The controller 306 may be further configured to perform the determination of the total current consumption of the system 300, the determination of the amount of battery current available to the digital image capture unit 303, and/or the adjusting of the current consumption of the digital image capture unit 303 repeatedly for a time period. For example, the amount of current available may be updated e.g. between capturing digital image frames continuously within one session.

The adjusting of the current consumption of the digital image capture unit 303 including the illumination unit 302 may comprise maximizing the current consumption within the determined available amount of battery current. The illumination unit 302 may comprise e.g. one or more LEDs.

In an embodiment in which the illumination unit 302 comprises more than one LED, the adjusting of the current consumption of the digital image capture unit 303 including the illumination unit 302 may comprise driving only a portion of the multiple LEDs (e.g. driving only one LED) in response to the amount of current available falling below a given threshold. In an embodiment, the adjusting of the current consumption of the digital image capture unit 303 including the illumination unit 302 may comprise lowering the brightness of the illumination unit 302 in response to the amount of current available falling below a given threshold.

As an example, when the digital image capture unit is active, the controller may periodically acquire data about the prevailing overall current consumption of the apparatus or system. This data may be stored into a buffer, which may hold e.g. 20 of the latest values. One value describes e.g. the current consumption at the specific moment when the value was acquired. The interval between acquiring two single points of data can vary, depending e.g. on the actions of software in an imaging stack. As an example, data could be acquired in 30 millisecond (ms) intervals, which would result in data from a 20*30 ms=600 ms period in the buffer.

When a still image with flash illumination is requested, the controller (e.g. a LED driver) may acquire e.g. one more value and then start to evaluate the 20 values of momentary current consumption—first it finds the highest of those values. Then, it calculates how much there is left to a pre-determined limit. The pre-determined limit is below a battery safety circuit current limit to leave room for some increase in the overall system current consumption.

For example: from the 20 values, a value of 2400 mA is the highest. The pre-determined limit is 4600 mA. Battery safety circuit has a limit of 5500 mA. The controller is configured to ensure that using the illumination unit will consume no more than 4600 mA−2400 mA=2200 mA of current from the battery. The same limit may be used for the entire image capture which may include e.g. 1 or 2 pre-flashes and 1 main flash.

After the image capture is completed and the digital image capture unit returns to its original state, the controller may empty the buffer of its 20 values and start collecting data again.

Figure 4:
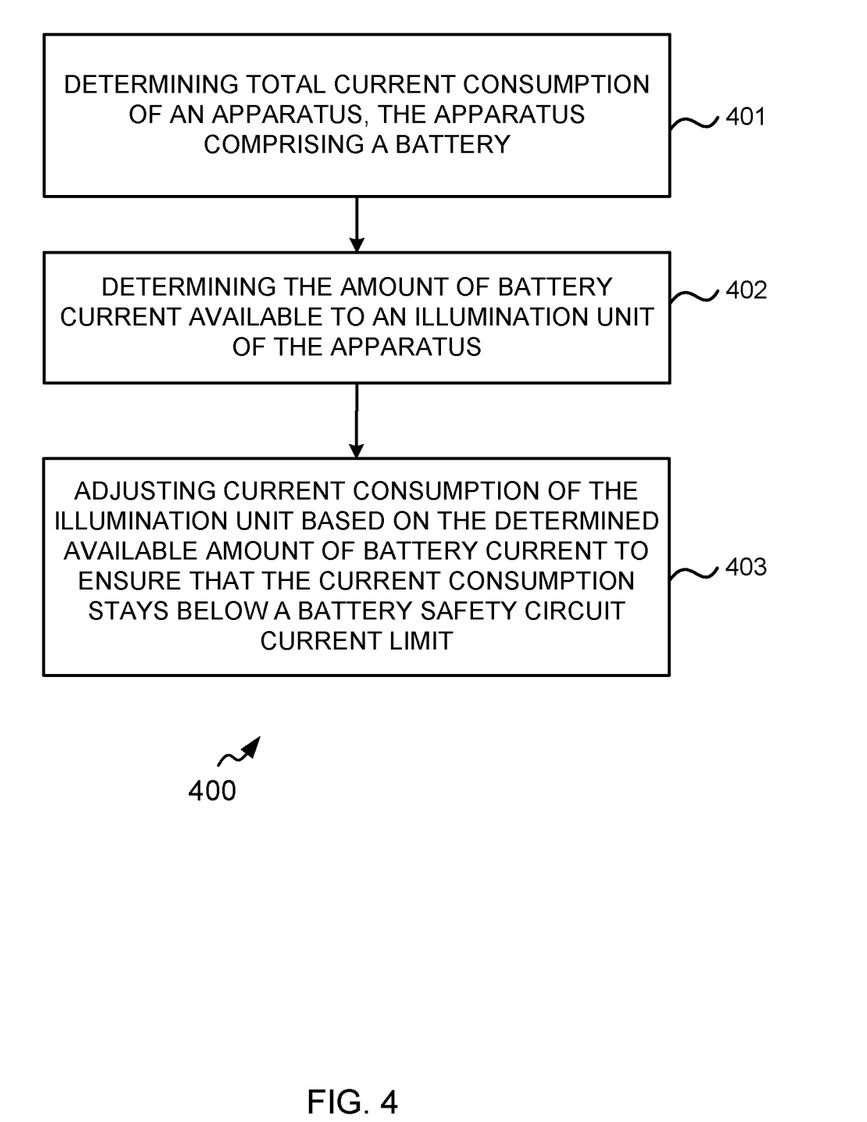
FIG. 4 is an example flow diagram of a method in accordance with an example embodiment.

FIG. 4 is an example flow diagram of a method in accordance with an example embodiment. At operation 401, total current consumption of an apparatus is determined. The apparatus comprises a battery that has a first characteristic capability for providing continuous power and a second characteristic capability for providing intermittent power to the apparatus, and an illumination unit. At operation 402, the amount of battery current available to the illumination unit is determined. At operation 403, current consumption of the illumination unit is adjusted based on the determined available amount of battery current to ensure that the current consumption of the illumination unit stays below a battery safety circuit current limit.

The determination of the total current consumption of the apparatus at operation 401 may comprise acquiring data related to the total current consumption of the apparatus transpired over a time period. The determination of the amount of battery current available to the illumination unit at operation 402 may comprise utilizing the acquired data.

Operation 401 may be performed by the controllers 106, 206, 306 of FIGS. 1-3, respectively. Operation 402 may be performed by the controllers 106, 206, 306 of FIGS. 1-3, respectively. Operation 403 may be performed by the controllers 106, 206, 306 of FIGS. 1-3, respectively.

Figure 5:
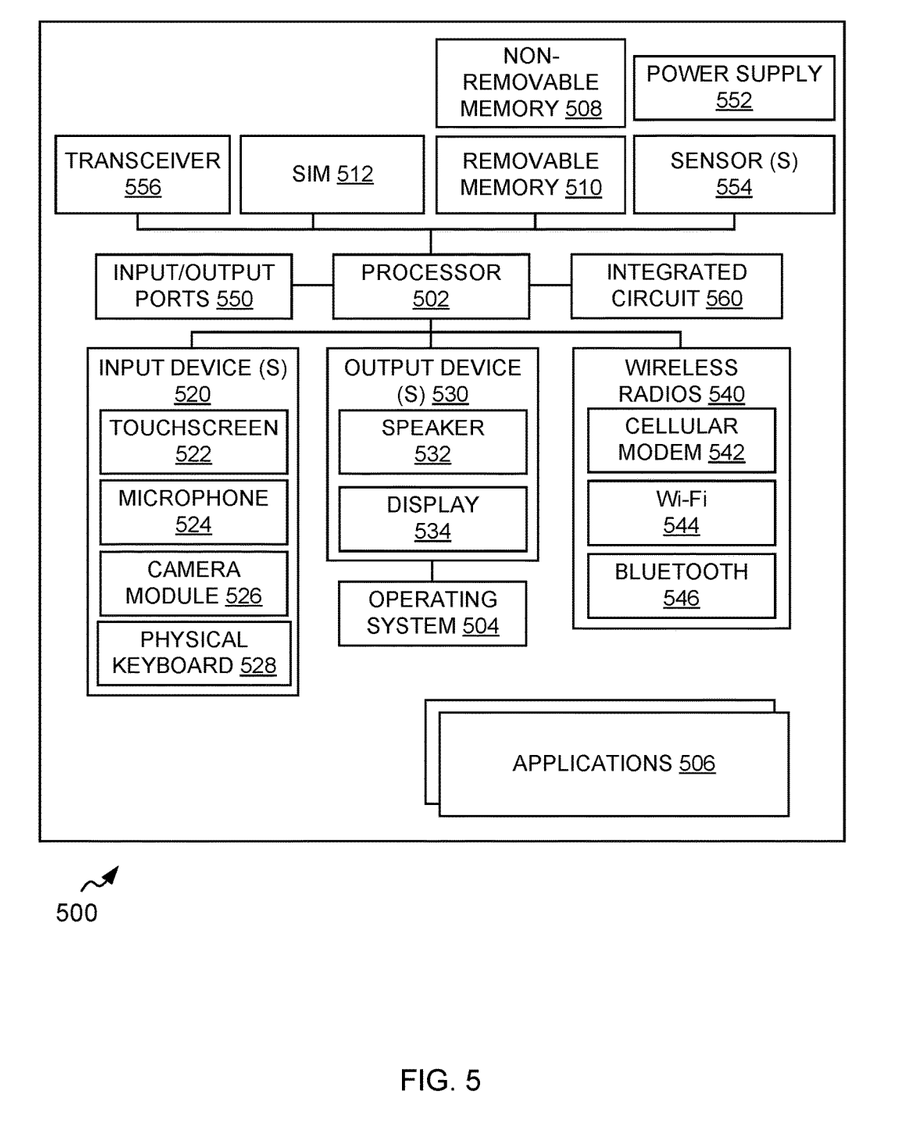
FIG. 5 illustrates an example block diagram of an electronic device capable of implementing example embodiments described herein.

FIG. 5 is a schematic block diagram of an electronic device 500 capable of implementing embodiments of the techniques described herein. It should be understood that the electronic device 500 as illustrated and hereinafter described is merely illustrative of one type of apparatus or an electronic device and should not be taken to limit the scope of the embodiments. As such, it should be appreciated that at least some of the components described below in connection with the electronic device 500 may be optional and thus in an example embodiment may include more, less or different components than those described in connection with the example embodiment of FIG. 5. As such, among other examples, the electronic device 500 could be any of apparatuses utilizing a battery and an illumination unit, such as wireless or mobile communication apparatuses, such as smartphones and tablet computers.

The illustrated electronic device 500 includes a controller or a processor 502 (i.e.—a signal processor, microprocessor, ASIC, or other control and processing logic circuitry) for performing such tasks as signal coding, data processing, input/output processing, power control, and/or other functions. An operating system 504 controls the allocation and usage of the components of the electronic device 500 and support for one or more application programs 506. The application programs 506 can include common mobile applications, for instance, telephony applications, email applications, calendars, contact managers, web browsers, messaging applications, or any other application. As discussed above, the operating system 504 may include the controller 106, 206, 306 of FIGS. 1-3 e.g. in the form of a software driver.

The illustrated electronic device 500 includes one or more memory components, for example, a non-removable memory 508 and/or removable memory 510. The non-removable memory 508 may include RAM, ROM, flash memory, a hard disk, or other well-known memory storage technologies. The non-removable memory 508 may include the memory 204, 304 of FIGS. 2-3. The removable memory 510 may include flash memory or smart cards. The one or more memory components may be used for storing data and/or code for running the operating system 504 and the applications 506. Examples of data may include web pages, text, images, sound files, image data, video data, or other data sets to be sent to and/or received from one or more network servers or other devices via one or more wired or wireless networks. The electronic device 500 may further include a subscriber identity module (SIM) 512. The SIM 512 typically stores information elements related to a mobile subscriber. A SIM is well known in Global System for Mobile Communications (GSM) communication systems, Code Division Multiple Access (CDMA) systems, or with third-generation (3G) wireless communication protocols such as Universal Mobile Telecommunications System (UMTS), CDMA1000, wideband CDMA (WCDMA) and time division-synchronous CDMA (TD-SCDMA), or with fourth-generation (4G) wireless communication protocols such as LTE (Long-Term Evolution). The SIM 512 may comprise a virtual SIM. Furthermore, multiple SIMs may be utilized.

The electronic device 500 can support one or more input devices 520 and one or more output devices 530. Examples of the input devices 520 may include, but are not limited to, a touchscreen 522 (i.e., capable of capturing finger tap inputs, finger gesture inputs, multi-finger tap inputs, multi-finger gesture inputs, or keystroke inputs from a virtual keyboard or keypad), a microphone 524 (i.e., capable of capturing voice input), a camera module 526 (i.e., capable of capturing still picture images and/or video images) and a physical keyboard 528. The camera module 526 can include the digital image capture units 203, 303 of FIGS. 2-3. Examples of the output devices 530 may include, but are not limited to a speaker 532 and a display 534. Other possible output devices (not shown) can include piezoelectric or other haptic output devices. Some devices can serve more than one input/output function. For example, the touchscreen 522 and the display 534 can be combined into a single input/output device.

In an embodiment, the electronic device 500 may comprise a wireless radio(s) 540. The wireless radio(s) 540 can support two-way communications between the processor 502 and external devices, as is well understood in the art. The wireless radio(s) 540 are shown generically and can include, for example, a cellular modem 542 for communicating at long range with the mobile communication network, a Wi-Fi radio 544 for communicating at short range with a local wireless data network or router, and/or a Bluetooth radio 546. The cellular modem 542 is typically configured for communication with one or more cellular networks, such as a GSM/3G/4G network for data and voice communications within a single cellular network, between cellular networks, or between the mobile device and a public switched telephone network (PSTN).

The electronic device 500 can further include one or more input/output ports 550, a power supply 552, one or more sensors 554, for example an accelerometer, a gyroscope, a compass, or an infrared proximity sensor for detecting the orientation or motion of the electronic device 500, and a transceiver 556 (for wirelessly transmitting analog or digital signals). The power supply 552 can include the batteries 101, 201, 301 of FIGS. 1-3. The illustrated components are not required or all-inclusive, as any of the components shown can be deleted and other components can be added.

Computer executable instructions may be provided using any computer-readable media that is accessible by computing based devices. Computer-readable media may include, for example, computer storage media such as memory and communications media. Computer storage media, such as memory includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing based devices it will be appreciated that the storage may be distributed or located remotely and accessed via a network or other communication link, for example by using a communication interface.

At least some of the examples disclosed in FIGS. 1-5 are able to provide battery current consumption adjustment for an illumination unit. When battery specific maximum possible current consumption of an apparatus/system is known and actual present current consumption is known, then illumination unit current consumption can be adjusted so that it is using maximum available current. At least some of the examples disclosed in FIGS. 1-5 allow more current to be used for illumination units in cases where other components are not consuming much current. If apparatus/system total current consumption is already high, then lower current may be utilized for the illumination unit. At least some of the examples disclosed in FIGS. 1-5 are able to provide dynamic battery current consumption adjustment for an illumination unit. Here, dynamic means that the amount of current available may be updated e.g. between capturing digital image frames continuously within one session.

An embodiment of an apparatus comprises a battery having a first characteristic capability for providing continuous power and a second characteristic capability for providing intermittent power to the apparatus; an illumination unit; and a controller configured to determine total current consumption of the apparatus, determine the amount of battery current available to the illumination unit, and adjust current consumption of the illumination unit based on the determined available amount of battery current to ensure that the current consumption of the illumination unit stays below a battery safety circuit current limit.

In an embodiment, alternatively or in addition to the above described embodiments, the controller is further configured to utilize at least one of battery voltage, internal battery resistance, or temperature to assist in at least one of the determination of the total current consumption of the apparatus or the determination of the amount of battery current available to the illumination unit.

In an embodiment, alternatively or in addition to the above described embodiments, the controller is further configured to perform the determination of the total current consumption of the apparatus by acquiring data related to the total current consumption of the apparatus transpired over a time period, and to utilize the acquired data to perform the determination of the amount of battery current available to the illumination unit.

In an embodiment, alternatively or in addition to the above described embodiments, the controller is further configured to perform at least one of the determination of the total current consumption of the apparatus, the determination of the amount of battery current available to the illumination unit, or the adjusting of the current consumption of the illumination unit repeatedly for a time period.

In an embodiment, alternatively or in addition to the above described embodiments, the controller comprises a driver of the illumination unit.

In an embodiment, alternatively or in addition to the above described embodiments, the controller comprises at least one of software and hardware.

In an embodiment, alternatively or in addition to the above described embodiments, the adjusting of the current consumption of the illumination unit comprises maximizing the current consumption of the illumination unit within the determined available amount of battery current.

In an embodiment, alternatively or in addition to the above described embodiments, the determination of the total current consumption of the apparatus at a given time is performed substantially in real-time.

In an embodiment, alternatively or in addition to the above described embodiments, the apparatus further comprises a digital image capture unit, and the illumination unit is associated with the digital image capture unit.

In an embodiment, alternatively or in addition to the above described embodiments, the illumination unit comprises at least one light-emitting diode.

In an embodiment, alternatively or in addition to the above described embodiments, the apparatus comprises a wireless communication apparatus.

An embodiment of a system comprises a battery having a first characteristic capability for providing continuous power and a second characteristic capability for providing intermittent power to the system; a digital image capture unit comprising an illumination unit; and a controller configured to determine total current consumption of the system, determine the amount of battery current available to the digital image capture unit, and adjust current consumption of the digital image capture unit based on the determined available amount of battery current to ensure that the current consumption of the digital image capture unit comprising the illumination unit stays below a battery safety circuit current limit.

In an embodiment, alternatively or in addition to the above described embodiments, the illumination unit is re-attachable.

In an embodiment, alternatively or in addition to the above described embodiments, the controller is further configured to utilize at least one of battery voltage, internal battery resistance, or temperature to assist in at least one of the determination of the total current consumption of the system or the determination of the amount of battery current available to the digital image capture unit.

In an embodiment, alternatively or in addition to the above described embodiments, the controller is further configured to perform the determination of the total current consumption of the system by acquiring data related to the total current consumption of the system transpired over a time period, and to utilize the acquired data to perform the determination of the amount of battery current available to the digital image capture unit.

In an embodiment, alternatively or in addition to the above described embodiments, the controller is further configured to perform at least one of the determination of the total current consumption of the system, the determination of the amount of battery current available to the digital image capture unit, or the adjusting of the current consumption of the digital image capture unit repeatedly for a time period.

In an embodiment, alternatively or in addition to the above described embodiments, the adjusting of the current consumption of the digital image capture unit comprises maximizing the current consumption of the digital image capture unit within the determined available amount of battery current.

In an embodiment, alternatively or in addition to the above described embodiments, the controller comprises a driver of the illumination unit.

An embodiment of a method comprises determining, by a controller, total current consumption of an apparatus, the apparatus comprising a battery having a first characteristic capability for providing continuous power and a second characteristic capability for providing intermittent power to the apparatus, and an illumination unit; determining, by the controller, the amount of battery current available to the illumination unit; and adjusting, by the controller, current consumption of the illumination unit based on the determined available amount of battery current to ensure that the current consumption of the illumination unit stays below a battery safety circuit current limit.

In an embodiment, alternatively or in addition to the above described embodiments, the determining of the total current consumption of the apparatus comprises acquiring data related to the total current consumption of the apparatus transpired over a time period; and the determining of the amount of battery current available to the illumination unit comprises utilizing the acquired data.

The embodiments illustrated and described herein as well as embodiments not specifically described herein but within the scope of aspects of the disclosure constitute exemplary means for adjusting battery current consumption. For example, the elements illustrated in FIG. 1 to FIG. 3 constitute exemplary means for determining total current consumption of an apparatus, the apparatus comprising a battery having a first characteristic capability for providing continuous power and a second characteristic capability for providing intermittent power to the apparatus, and an illumination unit; exemplary means for determining the amount of battery current available to the illumination unit; and exemplary means for adjusting current consumption of the illumination unit based on the determined available amount of battery current to ensure that the current consumption of the illumination unit stays below a battery safety circuit current limit.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include mobile telephones (including smart phones), tablet computers and many other devices.

The processes described herein may be performed by software in machine readable form on a tangible storage medium e.g. in the form of a computer program comprising computer program code means adapted to perform all the steps of any of the processes described herein when the program is run on a computer and where the computer program may be embodied on a computer readable medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims, and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

Aspects of any of the examples described above may be combined with aspects of any of the other examples described to form further examples without losing the effect sought.

The term 'comprising' is used herein to mean including the blocks or elements identified, but that such blocks or elements do not comprise an exclusive list, and a system, a device or an apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. An apparatus, comprising:
   a battery having a first characteristic capability for providing continuous power and a second characteristic capability for providing intermittent power to the apparatus;
   an illumination unit; and
   a controller configured to determine total current consumption of the apparatus, determine the amount of battery current available to the illumination unit, and adjust current consumption of the illumination unit based on the determined available amount of battery current to ensure that the current consumption of the illumination unit stays below a battery safety circuit current limit;
   wherein the adjusting of the current consumption of the illumination unit comprises maximizing the current consumption of the illumination unit within the determined available amount of battery current.

2. The apparatus as claimed in claim 1, wherein the controller is further configured to utilize at least one of battery voltage, internal battery resistance, or temperature to assist in at least one of the determination of the total current consumption of the apparatus or the determination of the amount of battery current available to the illumination unit.

3. The apparatus as claimed in claim 1, wherein the controller is further configured to perform the determination of the total current consumption of the apparatus by acquiring data related to the total current consumption of the apparatus transpired over a time period, and to utilize the acquired data to perform the determination of the amount of battery current available to the illumination unit.

4. The apparatus as claimed in claim 1, wherein the controller is further configured to perform at least one of the determination of the total current consumption of the apparatus, the determination of the amount of battery current available to the illumination unit, or the adjusting of the current consumption of the illumination unit repeatedly for a time period.

5. The apparatus as claimed in claim 1, wherein the controller comprises a driver of the illumination unit.

6. The apparatus as claimed in claim 1, wherein the controller comprises at least one of software and hardware.

7. The apparatus as claimed in claim 1, wherein the determination of the total current consumption of the apparatus at a given time is performed substantially in real-time.

8. The apparatus as claimed in claim 1, further comprising a digital image capture unit, wherein the illumination unit is associated with the digital image capture unit.

9. The apparatus as claimed in claim 1, wherein the illumination unit comprises at least one light-emitting diode.

10. The apparatus as claimed in claim 1, wherein the apparatus comprises a wireless communication apparatus.

11. A system, comprising:
    a battery having a first characteristic capability for providing continuous power and a second characteristic capability for providing intermittent power to the system;
    a digital image capture unit comprising an illumination unit; and
    a controller configured to determine total current consumption of the system, determine the amount of battery current available to the digital image capture unit, and adjust current consumption of the digital image capture unit based on the determined available amount of battery current to ensure that the current consumption of the digital image capture unit comprising the illumination unit stays below a battery safety circuit current limit;
    wherein the adjusting of the current consumption of the digital image capture unit comprises maximizing the current consumption of the digital image capture unit within the determined available amount of battery current.

12. The system as claimed in claim 11, wherein the illumination unit is re-attachable.

13. The system as claimed in claim 11, wherein the controller is further configured to utilize at least one of battery voltage, internal battery resistance, or temperature to assist in at least one of the determination of the total current consumption of the system or the determination of the amount of battery current available to the digital image capture unit.

14. The system as claimed in claim 11, wherein the controller is further configured to perform the determination of the total current consumption of the system by acquiring data related to the total current consumption of the system transpired over a time period, and to utilize the acquired data to perform the determination of the amount of battery current available to the digital image capture unit.

15. The system as claimed in claim 11, wherein the controller is further configured to perform at least one of the determination of the total current consumption of the system, the determination of the amount of battery current available to the digital image capture unit, or the adjusting of the current consumption of the digital image capture unit repeatedly for a time period.

16. The system as claimed in claim 11, wherein the controller comprises a driver of the illumination unit.

17. A method, comprising:
  determining, by a controller, total current consumption of an apparatus, the apparatus comprising a battery having a first characteristic capability for providing continuous power and a second characteristic capability for providing intermittent power to the apparatus, and an illumination unit;
  determining, by the controller, the amount of battery current available to the illumination unit; and
  adjusting, by the controller, current consumption of the illumination unit based on the determined available amount of battery current to ensure that the current consumption of the illumination unit stays below a battery safety circuit current limit;
  wherein the adjusting of the current consumption of the illumination unit comprises maximizing the current consumption of the illumination unit within the determined available amount of battery current.

18. The method as claimed in claim 17, wherein:
  the determining of the total current consumption of the apparatus comprises acquiring data related to the total current consumption of the apparatus transpired over a time period; and
  the determining of the amount of battery current available to the illumination unit comprises utilizing the acquired data.

19. The method as claimed in claim 17, further comprising utilizing, by the controller, at least one of battery voltage, internal battery resistance, or temperature to assist the determination of the total current consumption of the apparatus.

20. The method as claimed in claim 17, further comprising utilizing, by the controller, at least one of battery voltage, internal battery resistance, or temperature to assist in the determination of the amount of battery current available to the illumination unit.

* * * * *